United States Patent
Tamaki et al.

(10) Patent No.: US 7,092,732 B2
(45) Date of Patent: Aug. 15, 2006

(54) RADIO-COMMUNICATION CONTROL METHOD AND EQUIPMENT

(75) Inventors: Tsuyoshi Tamaki, Hachioji (JP); Satoshi Tamaki, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 521 days.

(21) Appl. No.: 10/642,301

(22) Filed: Aug. 18, 2003

(65) Prior Publication Data
US 2004/0171402 A1    Sep. 2, 2004

(30) Foreign Application Priority Data
Feb. 27, 2003    (JP) .............................. 2003-050245

(51) Int. Cl.
*H04B 7/00* (2006.01)
*H04Q 7/20* (2006.01)

(52) U.S. Cl. ...................... 455/522; 455/63.1; 455/450; 455/452.1; 455/452.2; 455/522; 370/338; 370/401

(58) Field of Classification Search .............. 455/63.1, 455/450, 451, 522, 452.1, 452.2; 370/338, 370/401
See application file for complete search history.

(56) References Cited

U.S. PATENT DOCUMENTS 6,587,510 B1 * 7/2003 Minami et al. ............. 375/285
6,912,228 B1 * 6/2005 Dahlman et al. ........... 370/441
6,975,641 B1 * 12/2005 Kurobe et al. ............. 370/445

* cited by examiner

*Primary Examiner*—Nay Maung
*Assistant Examiner*—Tuan H. Nguyen
(74) *Attorney, Agent, or Firm*—Mattingly, Stanger, Malur & Brundidge P.C.

(57) ABSTRACT

A signal pair interference power ratio of the received signal at a user terminal is obtained and this ratio is then compared with the signal pair interference power ratio required for correct demodulation. Accordingly, the user terminals can be classified into those in the non-interference domain and those in the interference domain. A plurality of access points make the simultaneous communications to the user terminals in the non-interference domain and also make the communications on the time-division basis to the user terminals in the interference domain. Thereby, it is now possible to solve the problem, in the communication system in which the total throughput of the system can be improved through simultaneous transmissions from a plurality of access points with the wireless access system to connect the user terminals to the wired network via the access points, that the throughput of the user terminal which cannot demodulate correctly the desired signal if the data packets collide with each other is more deteriorated than the user terminal which can correctly demodulate the desired signal because the desired signal pair interference power ratio is large even when the data packets collide with each other.

20 Claims, 14 Drawing Sheets

FIG.7

DATABASE INFORMATION FOR TRANSMISSION CONTROL (1) ACCESS POINT SETTING INFORMATION

|      | TRANSMISSION POWER OF BEACON SIGNAL | CARRIER SENSE THRESHOLD |
|------|-------------------------------------|-------------------------|
| AP 1 | 15 dBm                              | −94 dBm                 |
| AP i | AP i_Btxp                           | AP i_CSthr              |
| AP X | 15 dBm                              | −90 dBm                 |

(2) RECEIVED POWER INFORMATION OF BEACON SIGNAL OF ACCESS POINTS

|      | AP 1    | ·· | AP i            | AP X    |
|------|---------|----|-----------------|---------|
| AP 1 | −       |    |                 | −94 dBm |
| AP j |         |    | AP i_AP j_Brxp  |         |
| AP X | −94 dBm |    |                 | −       |

(3) RECEIVED POWER INFORMATION OF BEACON SIGNAL OF USER TERMINALS

|       | AP 1    | ·· | AP i            | AP X    |
|-------|---------|----|-----------------|---------|
| STA 1 | −65 dBm |    |                 | −94 dBm |
| STA j |         |    | AP i_STA j_Brxp |         |
| STA X | −94 dBm |    |                 | −62 dBm |

(4) TRAFFIC INFORMATION OF ACCESS POINTS (DOWNLINK)

|      | STA 1      | ·· | STA j          | STA X      |
|------|------------|----|----------------|------------|
| AP 1 | 8 kbit/s   |    |                | 250 kbit/s |
| AP i |            |    | AP i_STA j_TRA |            |
| AP X | 100 kbit/s |    |                | 100 kbit/s |

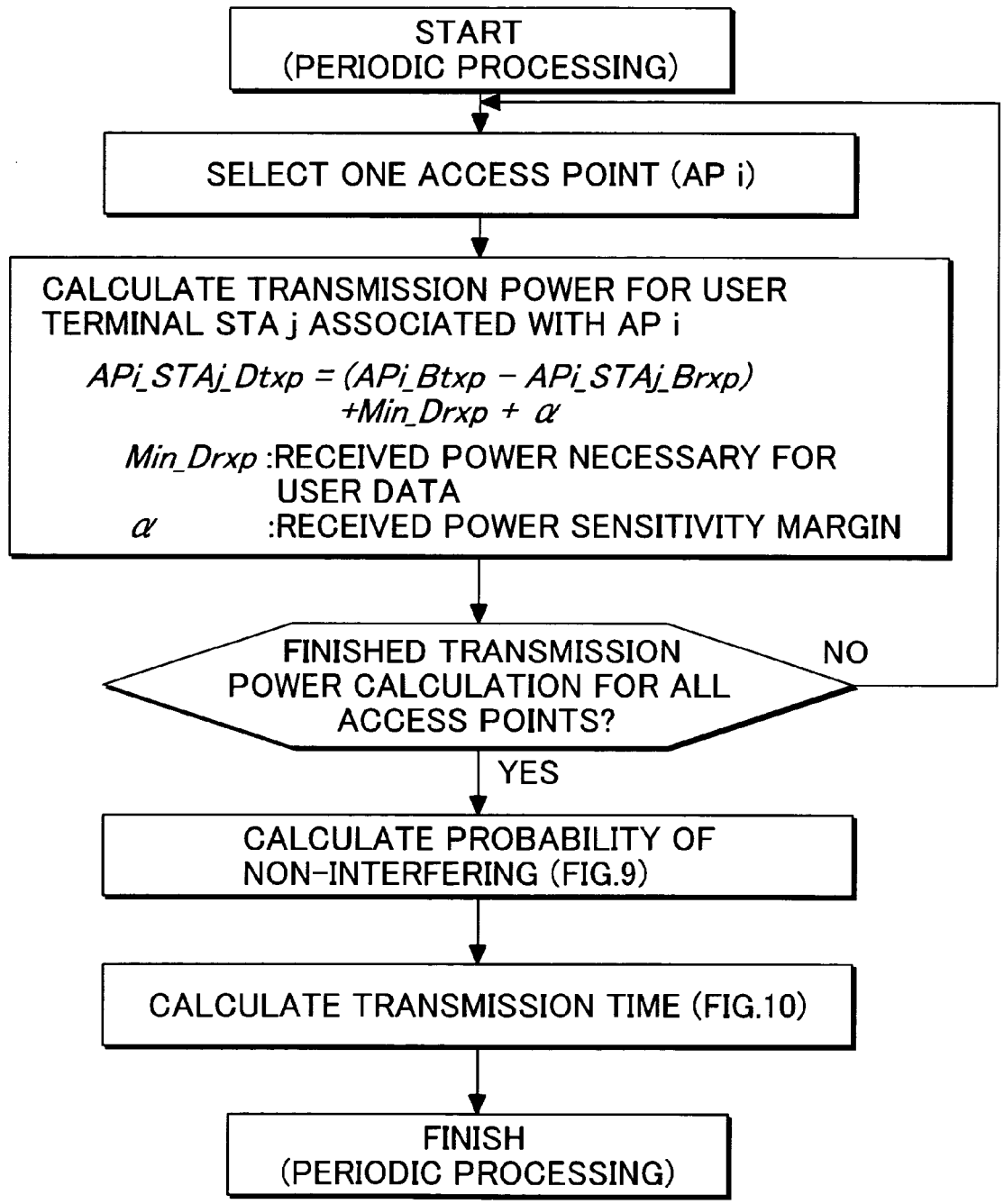

ALGORITHM OF TRANSMITTING CONTROL
INFORMATION CALCULATION PART
(STEP2: CALCULATE PROBABILITY OF NON-INTERFERENCE)

ALGORITHM OF TRANSMITTING CONTROL INFORMATION CALCULATION PART
(STEP3: CALCULATE TRANSMISSION TIME)

FIG.11

TRANSMITTING CONTROL SIGNAL INFORMATION FROM A MANAGEMENT SERVER TO AN ACCESS POINT

| 1 CONTROL FRAME PERIOD (T_frame) ||
|---|---|
| TRANSMISSION TIME FOR ALL AP TO STATIONS IN NON-INTERFERENCE DOMAIN (T_noint) ||
| THE NUMBER OF ACCESS POINTS WHICH CARRY OUT MUTUAL INTERFERENCE ||
| AP1 ID | TRANSMISSION TIME FOR AP1 T_AP1 |
| AP2 ID | TRANSMISSION TIME FOR AP2 T_AP2 |
| RANDOM ACCESS TIME (T_rnd) ||
| THE NUMBER OF USER TERMINALS (STA_Num) ||
| SIR OF MINIMUM REQUIREMENT (SIR_req) ||
| STA1 ID | SIR 1 | TRANSMISSION POWER AP1_STA1_Dtxp |
| STA3 ID | SIR 3 | TRANSMISSION POWER AP1_STA3_Dtxp |

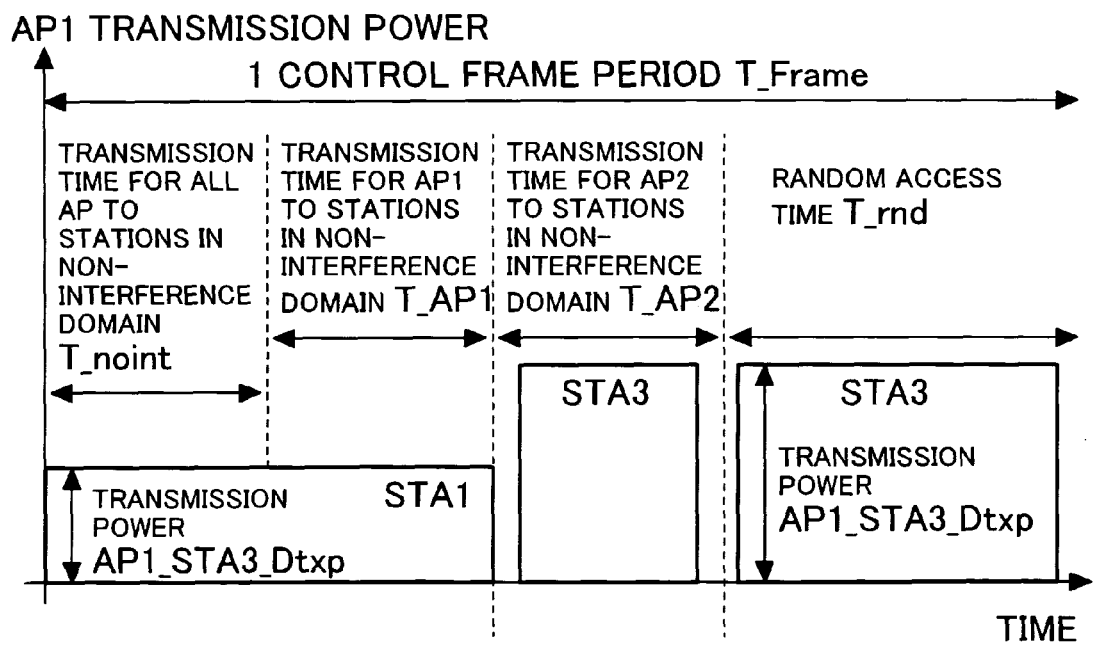

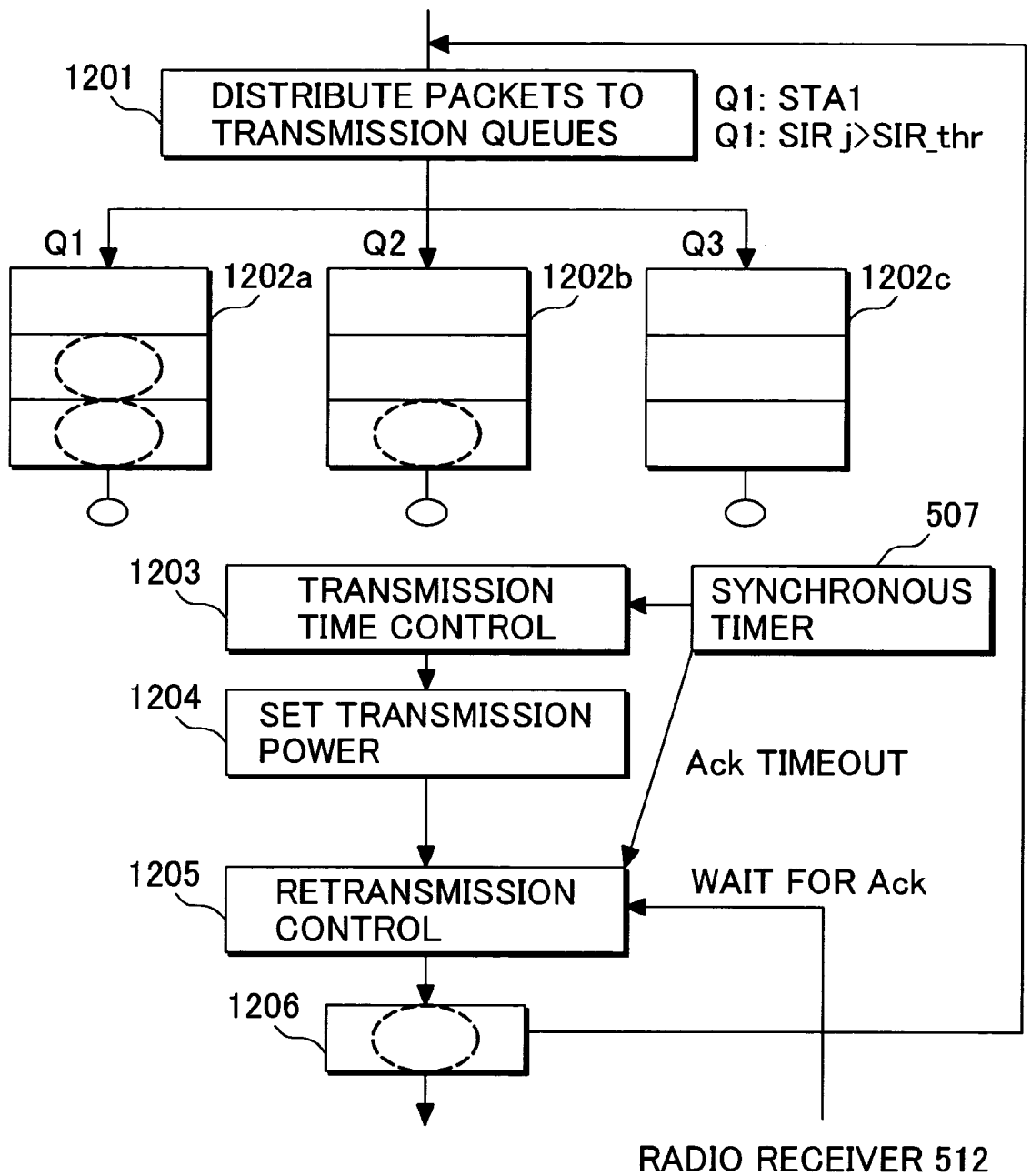

FIG.13
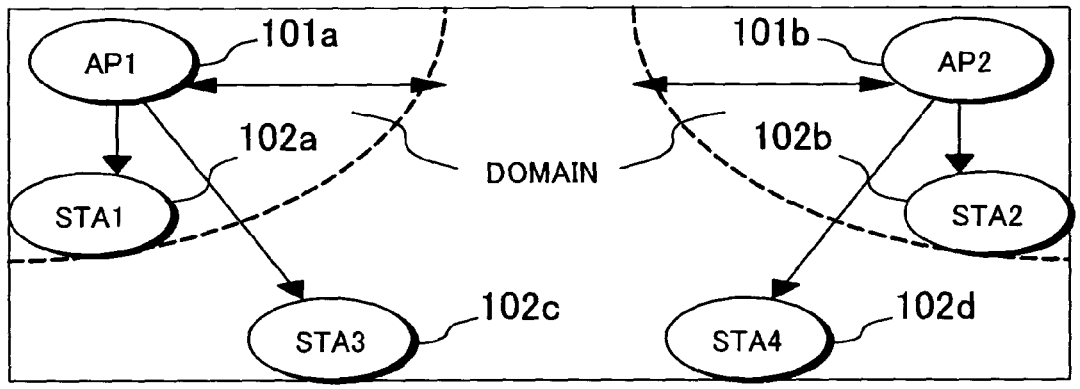
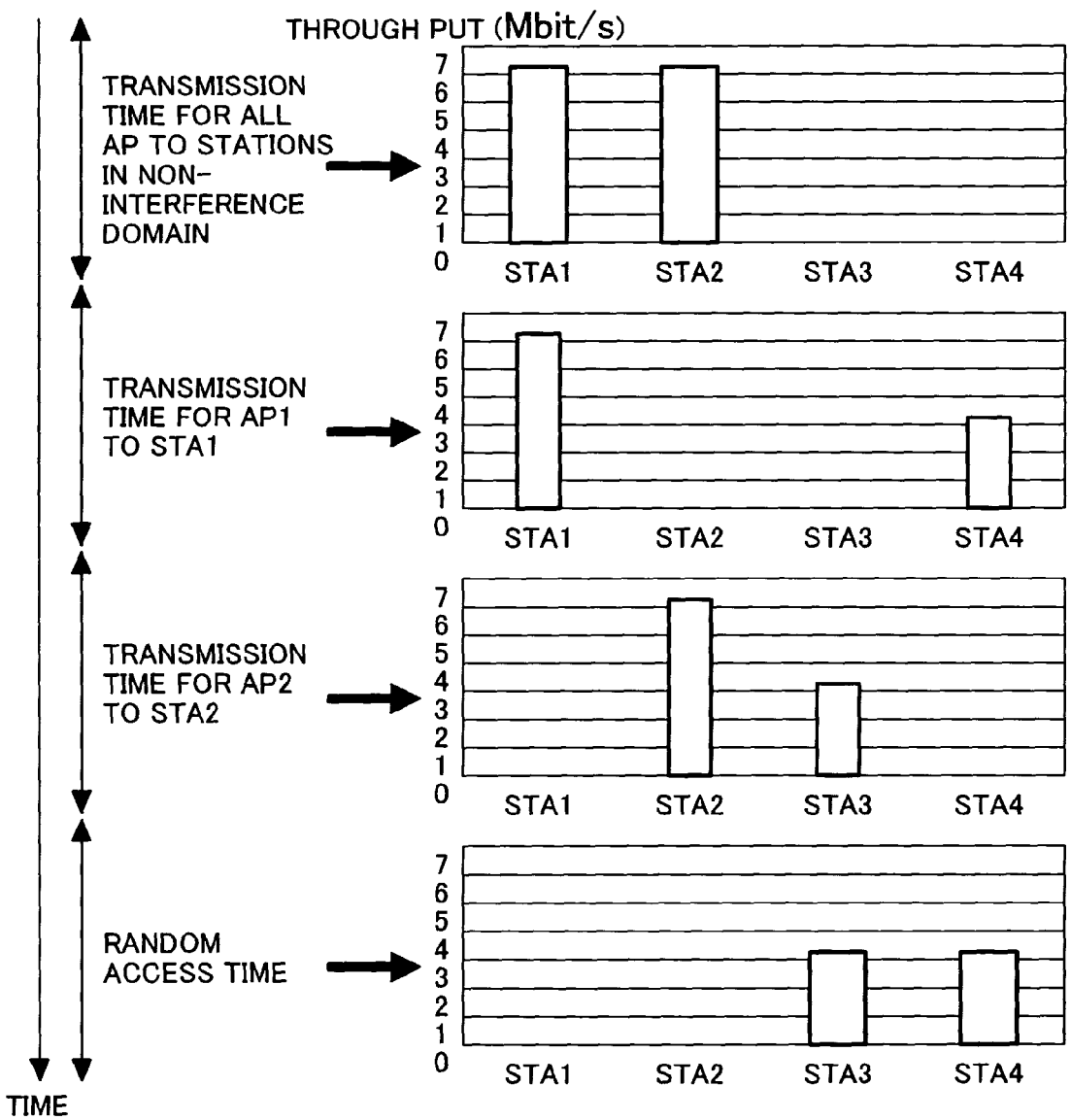

FIG. 14A
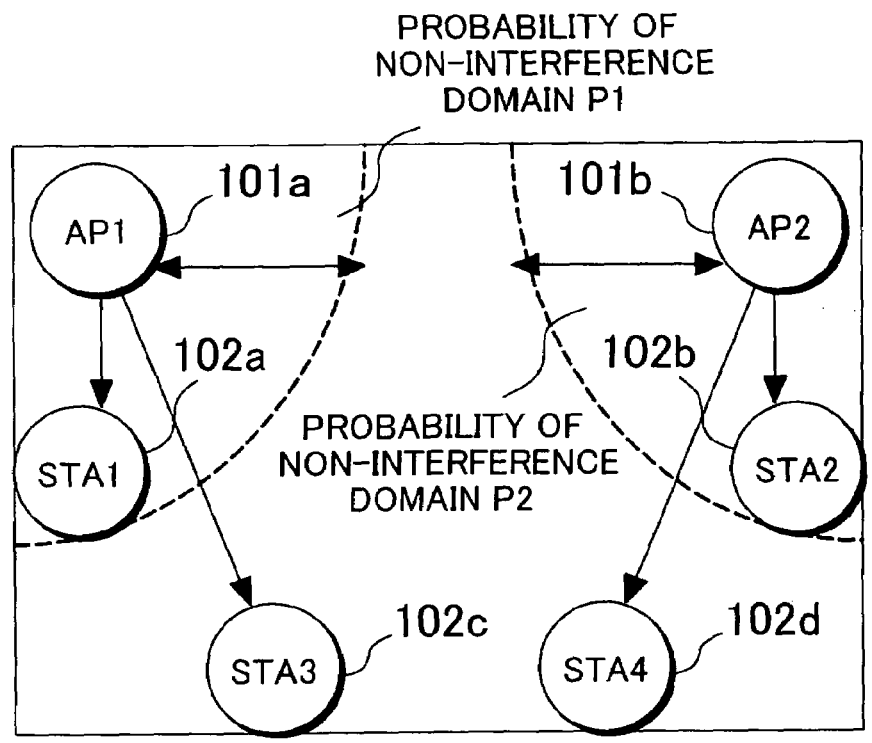
THE EFFECT AT THE TIME OF 2 PARALLEL TRANSMISSIONS
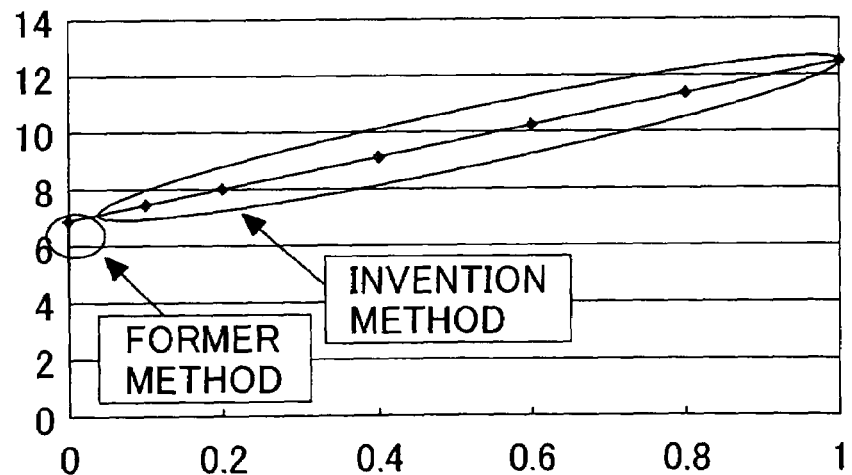
FIG. 14B

RADIO-COMMUNICATION CONTROL METHOD AND EQUIPMENT

FIELD OF THE INVENTION

The present invention relates to wireless access system and transmission system in radio-communication systems.

BACKGROUND OF THE INVENTION

In the conventional wireless access system, user terminals are connected to a wired network as represented by the wireless LAN via access points in order to enjoy the Internet services. In the existing wireless LAN, interference may be avoided through time multiplexing of the communication time between a plurality of user terminals and access points with a structure of carrier sense provided to detect communication devices which are making communication using the common frequency band but here rises a problem that since amount of data which can be transmitted in the unit time does not increase, the throughput of the entire system does not increase even when the number of access points is increased and thereby the throughput of an access point is lowered.

The JP-B No. 180775/2002 (U.S. patent Ser. No. 10/449, 100) filed previously provides a structure to increase the throughput of the entire system by simultaneously making communication among a plurality of access points as a measure to solve the problem described above.

FIG. 1 is an explanatory diagram of the method for improving the throughput with parallel transmissions among access points. In this figure, the access points 101a, 101b, and 101c are simultaneously making communications with user terminals 102a, 102b, and 102c. In this case, the simultaneous communications are realized by controlling the service area of the access point 101a so that the radio wave of the data transmitted from the access point 101a is not detected with a carrier sense of the access point 101b. The radio wave is not detected with a carrier sense under the condition that the power of the radio wave transmitted from the access point 101a goes lower than the reference received power preset in the access point 101b (hereinafter, referred to as a carrier sense threshold).

Similarly, the JP-B No. 180775/2002 provides a structure to control the service areas among the access points for parallel transmissions so that the radio wave transmitted from the access point 101b is not detected with a carrier sense of the access point 101c.

In the wireless access system described above, a structure to control the operations in order to satisfy the condition to simultaneously transmit data communication packets is described but this wireless access system does not refer to a problem that the packets transmitted are not correctly received because of interference of the other data communications and are sometimes discarded.

FIG. 2 is an explanatory diagram of signal pair interference power ratio in the wireless access system. The access point 101a transmits data packet in the transmission power AP1_TXP and the user terminal 102a receives the desired signal in the received power AP1_STA1_RXP. Moreover, the user terminal 102a receives the signal, which has been transmitted from the access point 102a as the data packet to the user terminal 102b in the transmission power AP2_TXP, as the interference signal in the received power AP2_STA1_RXP. In this timing, a power ratio of the desired signal and the interference signal becomes equal to the signal pair interference power ratio. Although, depending on the demodulation performance of a receiver, when the signal pair interference power ratio SIR is equal to or higher than the desired signal pair interference power ratio SIR_req, the data signal is demodulated correctly, but if it is equal to or lower than the desired signal pair interference power ratio SIR_req, the data signal is demodulated erroneously due to the collision of packets.

FIG. 3 is a graph showing an example of geographical distribution of the signal pair interference power ratio SIR. This figure indicates amplitudes of signal pair interference power ratios (SIRs) when the receiving places are changed in the data communication performed between both access points with the same radio-communication channel in the equal transmission power in the case where a room of 10 m square is assumed and the access point 101a and access point 101b are provided to the corners of this room. When the desired signal pair interference power ratio SIR_req is assumed as 10 dB, the predetermined signal pair interference power ratio SIR_req may be satisfied within the range of 4 m around the access points even when the communications are simultaneously conducted by abovementioned two access points. The domain in which the predetermined signal pair interference power ratio SIR_req is satisfied is hereinafter referred to as the non-interference domain. In the domain isolated by 4 m or more away from the access point, the predetermined signal pair interference power ratio SIR_req cannot be satisfied. This domain is hereinafter referred to as the interference domain. When two access points described above make communications simultaneously to the user terminals in this interference domain, here rises a problem that data is lost due to the collision of packets.

SUMMARY OF THE INVENTION

For the purpose of improving the throughputs of user terminals in the non-interference domain, the present invention provides, in order to solve the problems described above, a wireless access system to control deterioration of the throughput due to collision of data packets in which the simultaneous communications are performed from a plurality of access points to the user terminals in the non-interference domain and the time-divided communications are performed from carrier senses to user terminals in the interference domain, utilizing a means to judge whether the user terminals associated with the access points are in the interference domain or in the non-interference domain and a means for time division of the transmission time from the access points to the user terminals in the non-interference domain and the user terminals in the interference domain.

In more practical, an access point is provided with a means for periodically transmitting a beacon signal, a means for measuring received power of the beacon signal of the other access point, a means for notifying the measured received power and the preset transmission power of beacon signal, a means for transmitting the preset transmission timing and transmission power designated for each user terminal, and a means for synchronization of time for simultaneous transmissions from a plurality of access points. Moreover, a user terminal is provided with a means for measuring the received power of beacon signal of the access point and a means for notifying the measured received power information. In addition, an apparatus for integrated management of data communications at a plurality of access points (hereinafter, referred to as a management server) is also provided. This management server is provided with a means for collecting the received power information of the beacon signal and the transmission power information of the beacon signal measured at the access point and user terminal, a means for judging whether the user terminal is in the interference domain or in the non-interference domain using the collected information, a means for calculating the data transmission timing for user terminals in the interference domain and user terminals in the non-interference domain, a means for calculating the transmission power for each user terminal, a means for notifying the calculated transmission timing and transmission power to the access points, and a means for generating the signal for synchronizing the access points for simultaneous communications at a plurality of access points. The system is comprised of the apparatuses described above and thereby there is provided a wireless access system to improve the throughput of entire system through elimination of collision of data packets and control of deterioration of throughput of user terminals in the non-interference domain by dividing with time the transmitting time to the user terminals in the non-interference domain and user terminals in the interference domain.

BRIEF DESCRIPTION OF THE DRAWINGS

FIG. 7 explains database information for transmitting control such as (1) access point setting information, (2) received power information of beacon signal of access points, (3) received power information of beacon signal of user terminals, and (4) traffic information of access points (downlink) in the preferred embodiment of the present invention;

FIG. 8 is an algorithm (Part 1) of transmitting control information calculation in the preferred embodiment of the present invention;

FIG. 11 is an explanatory diagram of a transmitting control signal in the preferred embodiment of the present invention;

FIG. 12 is an explanatory diagram of a transmission control part of an access point in the preferred embodiment of the present invention;

FIG. 13 is a graphic diagram for evaluation of throughput in the preferred embodiment of the present invention; and FIGS. 14A and 14B are graphical diagrams of the effect at the time of two parallel transmissions and the probability of non-interfering in the former method and the invention method.

DETAILED DESCRIPTION OF THE PREFERRED EMBODIMENT

The preferred embodiment of the present invention will be described with reference to the accompanying drawings.

Figure 1:
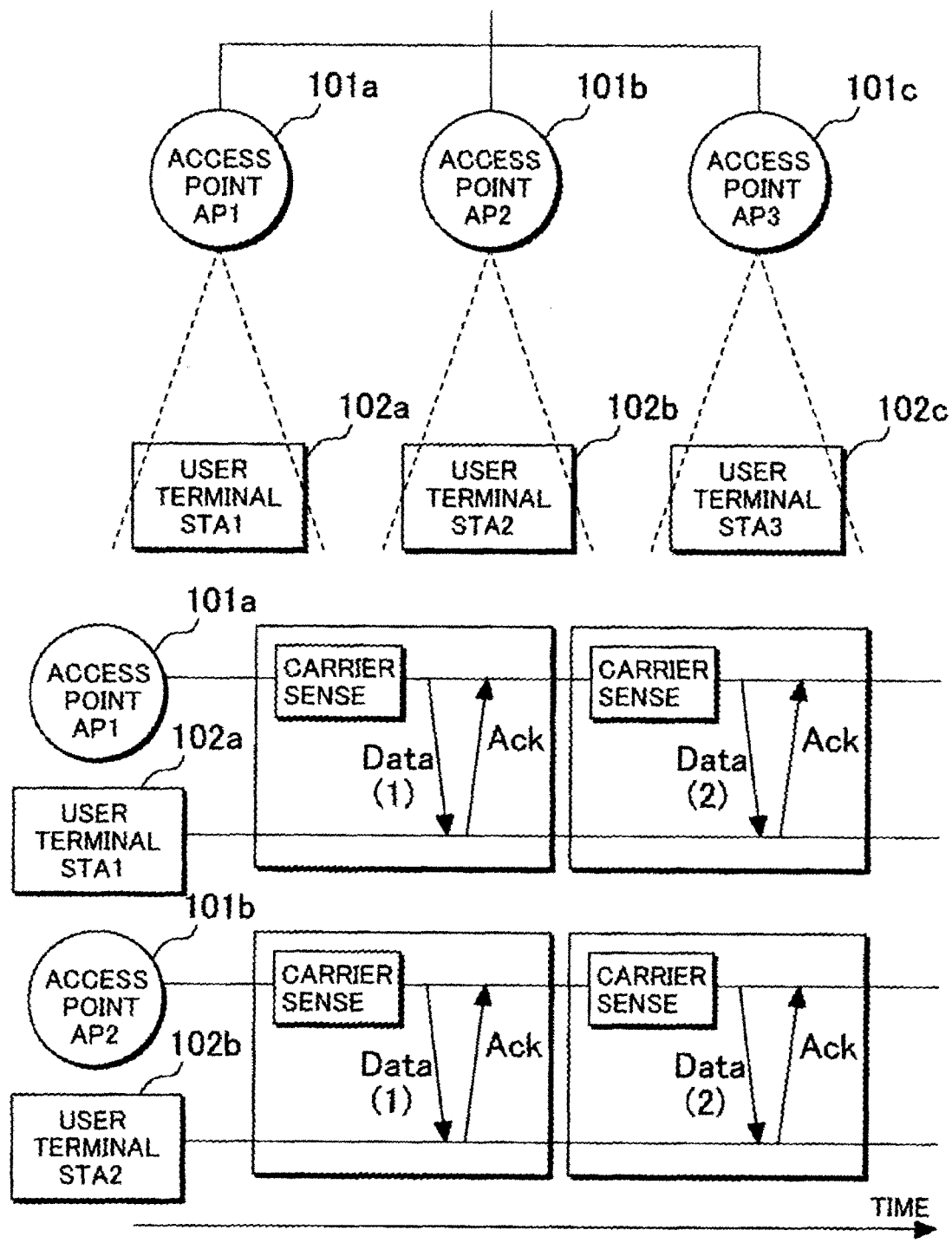
FIG. 1 is an explanatory diagram of a throughput improving method through parallel transmissions at access points in a wireless access system.
Figure 2:
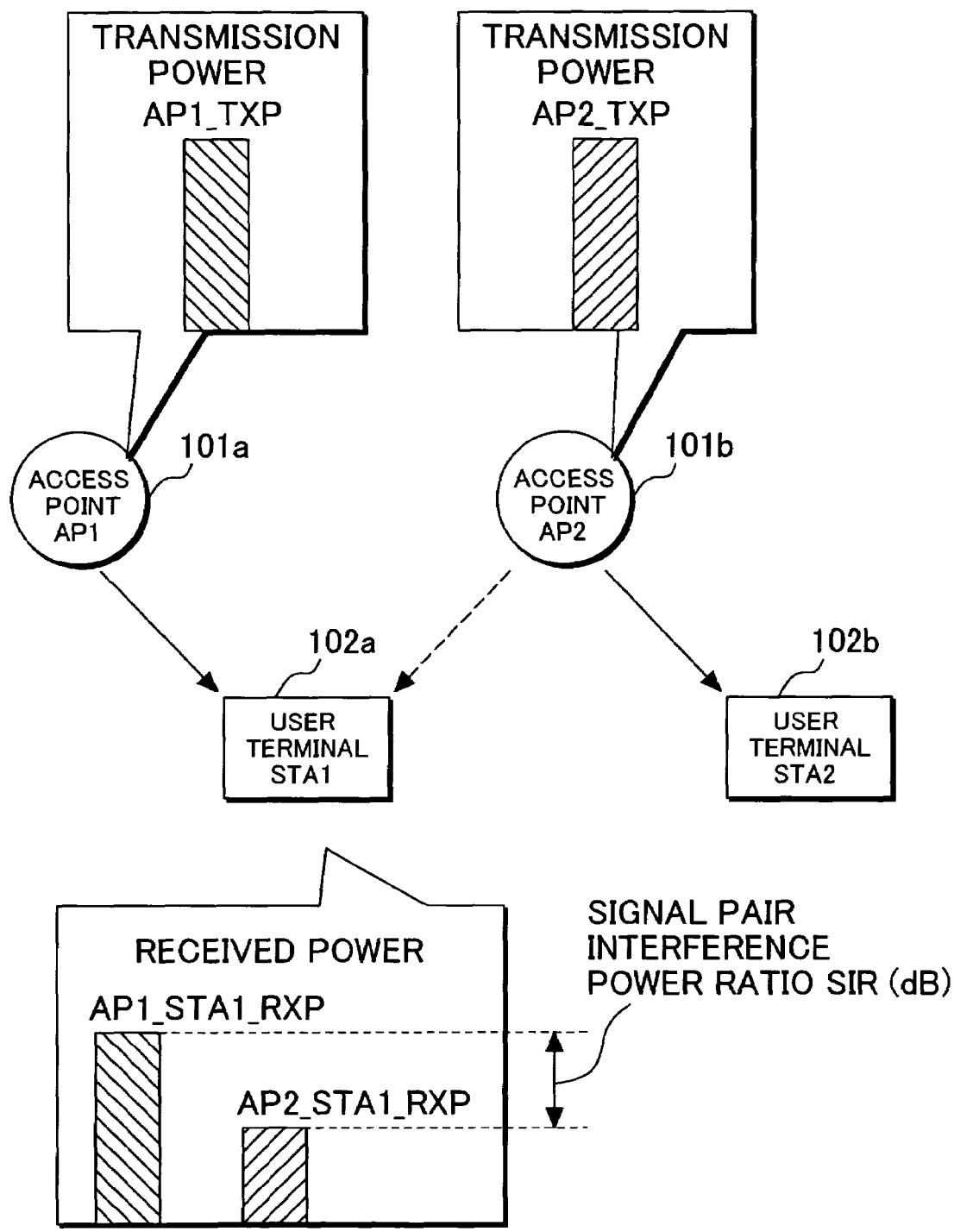
FIG. 2 is an explanatory diagram of signal pair interference power ratio in the wireless access system.
Figure 3:
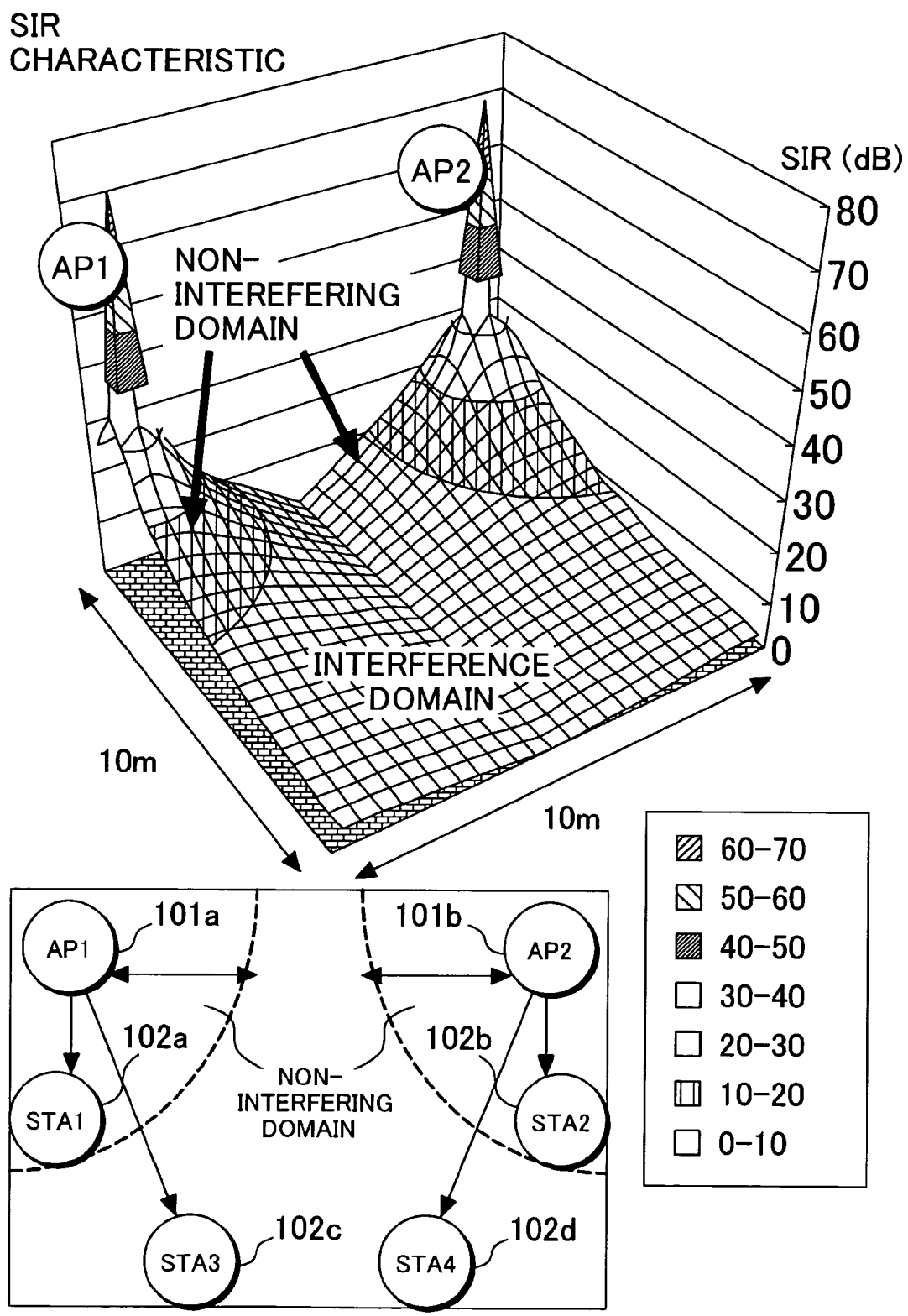
FIG. 3 is a graphic diagram indicating an example of geographical distribution characteristic of the signal pair interference power ratio.
Figure 4:
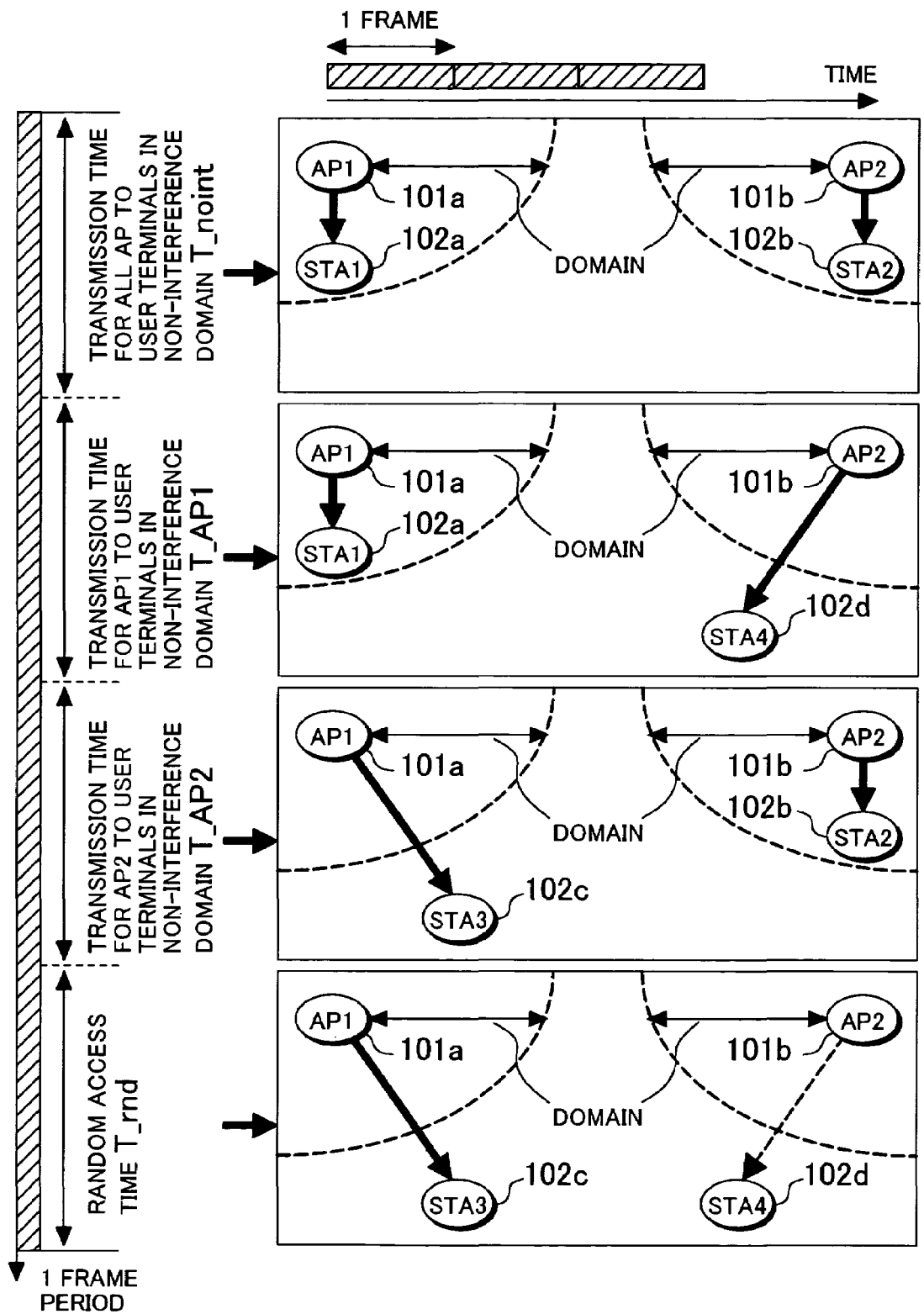
FIG. 4 is an explanatory diagram of a time dividing method of transmission time to user terminal in the preferred embodiment of the present invention.

FIG. 4 is an explanatory diagram of a time dividing method of transmitting time for each user terminal in the preferred embodiment of the present invention. There is described an example of data transmissions to user terminals 102*a* and 102*c* from an access point 101*a* and to user terminals 102*b* and 102*d* from an access point 101*b*. Here, it is assumed that the user terminals 102*a* and 102*b* are provided in the non-interference domain, while the user terminals 102*c* and 102*d* in the interference domain. First, there is described an example of simultaneous communications to the user terminals 102*a* and 102*b* provided in the non-interference domain from the access points 101*a* and 101*b*. The time required for simultaneous communications is hereinafter referred to as transmission time for all AP to user terminals in non-interference domain T_noint. Since the predetermined signal pair interference power ratio SIR_req is satisfied at user terminals within the transmission time for all AP to user terminals in non-interference domain T_noint even when the simultaneous communications are performed at a plurality of access points, each access point makes communication by invalidating carrier sense thereof.

Next, there is also described an example of communications between the access point 101*a* and the user terminal 102*a* in the non-interference domain and between the access point 101*b* and the user terminal 102*d* in the interference domain. This communication time is referred to as the transmission time for AP1 to user terminals in non-interference domain T_AP1. In this transmission time for AP1, since it is probable that packets will collide with each other at the user terminal 102*d* due to an interference signal from the access point 101*a*, the carrier sense of the access point 101*b* is validated, while the carrier sense of the access point 101*a* is kept invalidated.

Subsequently, there is described an example of communications between the access point 101*a* and the user terminal 102*c* in the interference domain and between the access point 101*b* and the user terminal 102*b* in the non-interference domain. This communication time is referred to as the transmission time for AP2 to user terminals in non-interference domain T_AP2. In this transmission time for AP2, the carrier sense of the access point 101*a* is validated, while the carrier sense of the access point 101*b* is kept invalidated.

Finally, there is described an example of communications between the access point 101*a* and the user terminal 102*c* in the interference domain and between the access point 101*b* and the user terminal 102*d* in the interference domain. In this case, communication is performed with the CSMA/CA system or the like between each access point and each user terminal. This communication time is referred to as the random access time T_rnd. In this case, the carrier senses of both access points 101*a* and 101*b* are validated.

Figure 5:
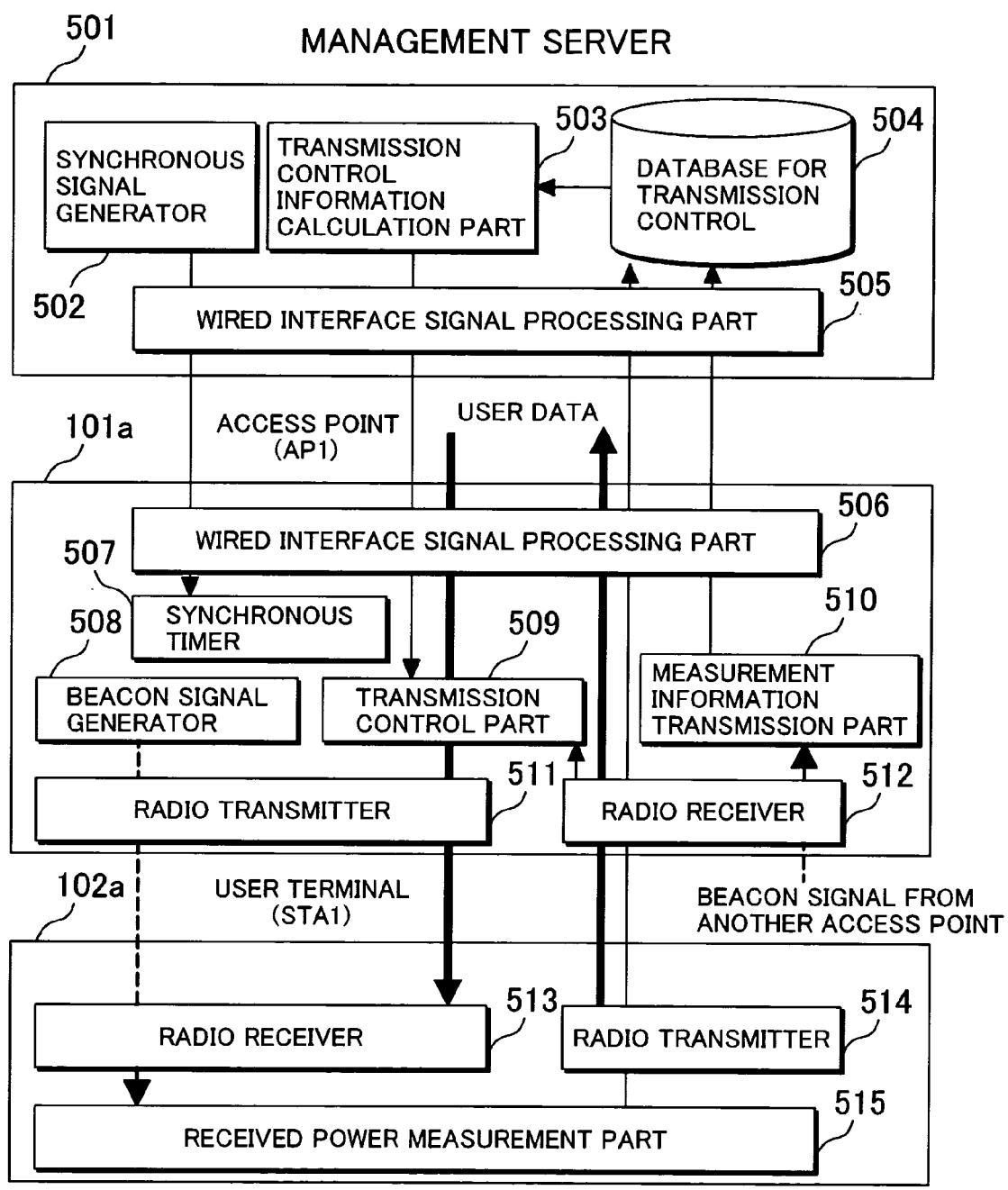
FIG. 5 is a system structural diagram in the preferred embodiment of the present invention.

FIG. 5 is a system structural diagram in the preferred embodiment of the present invention. The system of FIG. 5 is comprised of the access point 101*a*, the user terminal 102*a* and a management server 501 for management of access points. However, the management server 501 is assumed to be able to conducting management of a plurality of access points and user terminals.

The management server 501 comprises a synchronous signal generator 502 for generating a synchronous signal getting the timing of simultaneous communications at a plurality of access points, a wired interface signal processing part 505 for making communication with a plurality of access points, a database for transmission control 504 for collecting the beacon signal received power information and the beacon signal transmission power information measured at a plurality of access points and user terminals, and a transmitting control information calculation part 503 for calculating the data transmission timing, using the database 504 for transmission control, for the user terminals in the interference domain and user terminals in the non-interference domain and the transmission power to each user terminal and then notifying the calculated transmission timing and transmission power to the access points.

The access point 101*a* comprises a wired interface signal processing part 506 for making communication with the management server 501, a beacon signal generator 508 for periodically transmitting the beacon signal which is required to check the radio wave transmission condition in the transmission link for access points or user terminals, a radio transmitter 511 for transmitting the radio signal by encoding and modulating the transmission signals such as beam signal and data signal to realize errorless communication through the radio transmission link, a radio receiver 512 for demodulating and decoding the received radio signal to the original signal, a measurement information transmission part 510 for measuring the received power of the beacon signal from the other access points and then transmitting, to the management server 501, the beam transmission power, carrier sense threshold, and the measured beacon received power preset in the access point, a transmission control part 509 for transmitting the user data by setting the transmission timing and transmission power designated from the transmitting control information calculation part 503 for each user terminal, and a synchronous timer 507 for controlling the timing of the transmission control part or the like in synchronization with the synchronous signal generated by the synchronous signal generator 502 of the management server 501 for the simultaneous transmissions at a plurality of access points.

The user terminal 102*a* comprises a radio receiver 513 for receiving the radio signal from access points, a received power measurement part 515 for measuring the received power of beacon signal of access points, and a radio transmitter 514 for transmitting the radio signals such as result of measurement of received power and data signal to access points. The result of measurement of received power is notified to the management server 501 via access points.

As the flow of control signal, the measurement information is collected to database 504 for transmission control of the management server 501 from the measurement information transmission part 510 of the access point 101*a* and the received power measurement part 515 of the user terminal 102*a* and the transmitting control information calculation part 503 calculates the transmission timing and transmission power for each terminal to the transmission control part 509 using this database for transmission control 504 and thereafter notifies these calculated data to the relevant access point. The transmission control part 509 controls operations to make communication in the transmission timing and transmission power designated for the user data signal.

Figure 6:
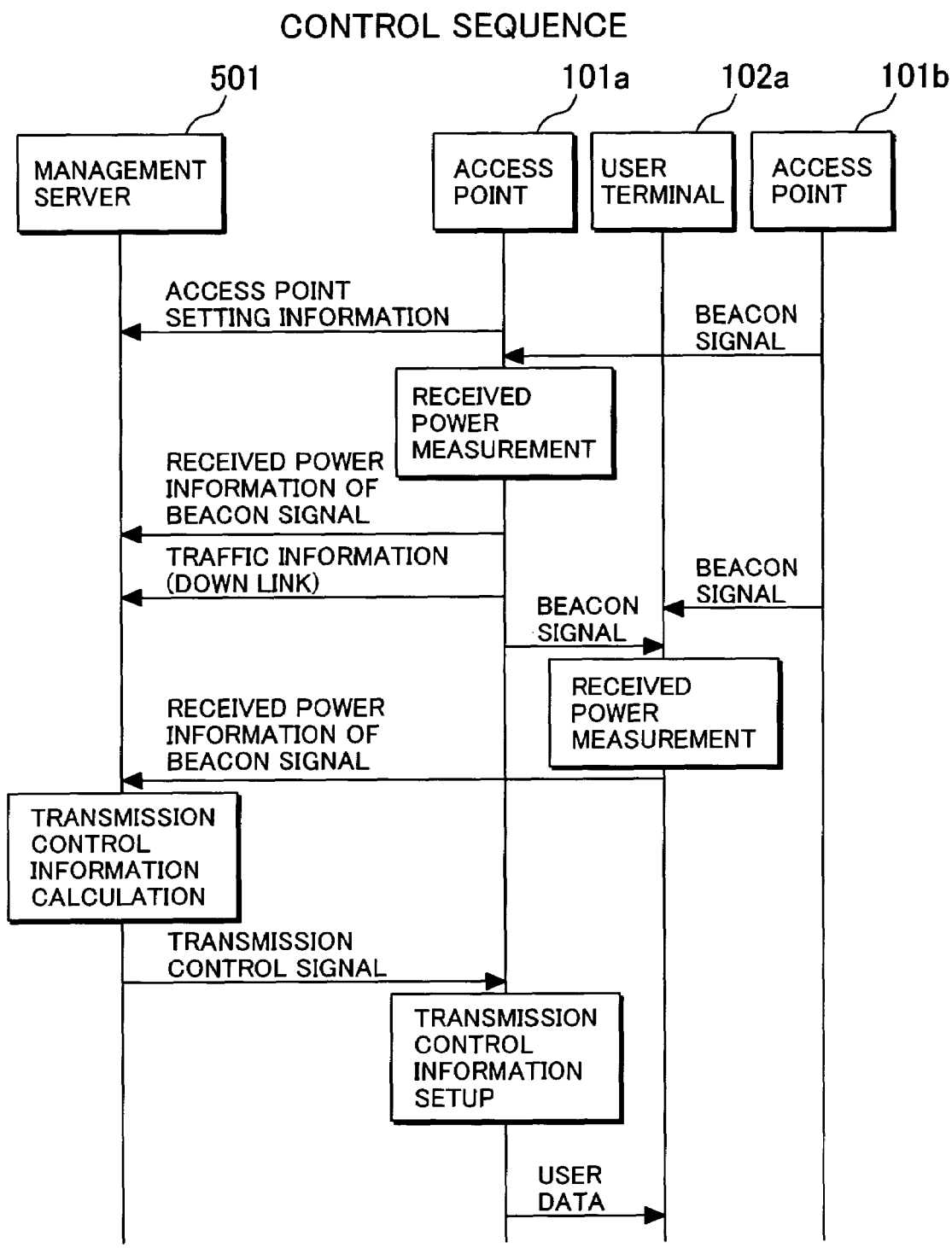
FIG. 6 is a control sequence diagram in the preferred embodiment of the present invention.

FIG. 6 is a control sequence diagram in the preferred embodiment of the present invention. First, the access point 101*a* transmits the access point setting values such as transmission power of beacon signal and carrier sense threshold value to the management server 501 as the access point setting information. Moreover, the access point 101*a* measures the received power of beacon signal transmitted from the other access point 101*b* and then notifies this received power to the management server 501 as the received power information of beacon signal. In addition, the access point 101*a* notifies the traffic information to user terminal from access point (down-link traffic information) to the management server 501. The user terminal 102*a* provided within the cell of access point 101*a* to receive the data from the access point 101*b* receives the beacon signals of the access points 101*a* and 101*b*, measures the received power, and notifies the measured power to the management server 501 as the received power information of beacon signal.

The management server 501 records the notified information to the database for transmission control 504 and calculates, based on this recorded information, the transmitting control information the transmission timing and transmission power of the data packet to the user terminal 102*a* from the access point 101*a*. The result of calculation is notified to the access point 101*a* as the transmitting control signal. Like the access point 101*a*, the transmitting control signal is also notified to the access point 101*b*. The access point 101*a* transmits the user data to the user terminal 102*a* in the designated transmission timing and transmission power.

FIG. 7 explains database information for transmitting control in the preferred embodiment of the present invention. The database for transmitting control comprises the access point setting information (1) indicating the transmission power of beacon signal (APi_Btxp) and carrier sense threshold (APi_CSthr) at each access point APi, the received power information (2) of beacon signal (APi_APj_Brxp) from the other access point APi of the access point APj, the received power information (3) of beacon signal (APi_STAj_Brxp) from the access point APi of the user terminal STAj, and the traffic information (APi_STAj_TRA) to the user terminal STAj from the access point APi (downlink). With the control sequence of FIG. 6, the information pieces described above are collected from a plurality of access points and user terminals.

As the embodiment of a method of measuring the traffic information (APi_STAj_TRA) of the access point APi, the traffic entering the queue of a transmitting buffer of the transmission control part 509 may be used as the amount of information per unit time. As the other embodiment, the average length of queue of the transmitting buffer of the transmission control part 509 may be used as the traffic information.

Figure 9:
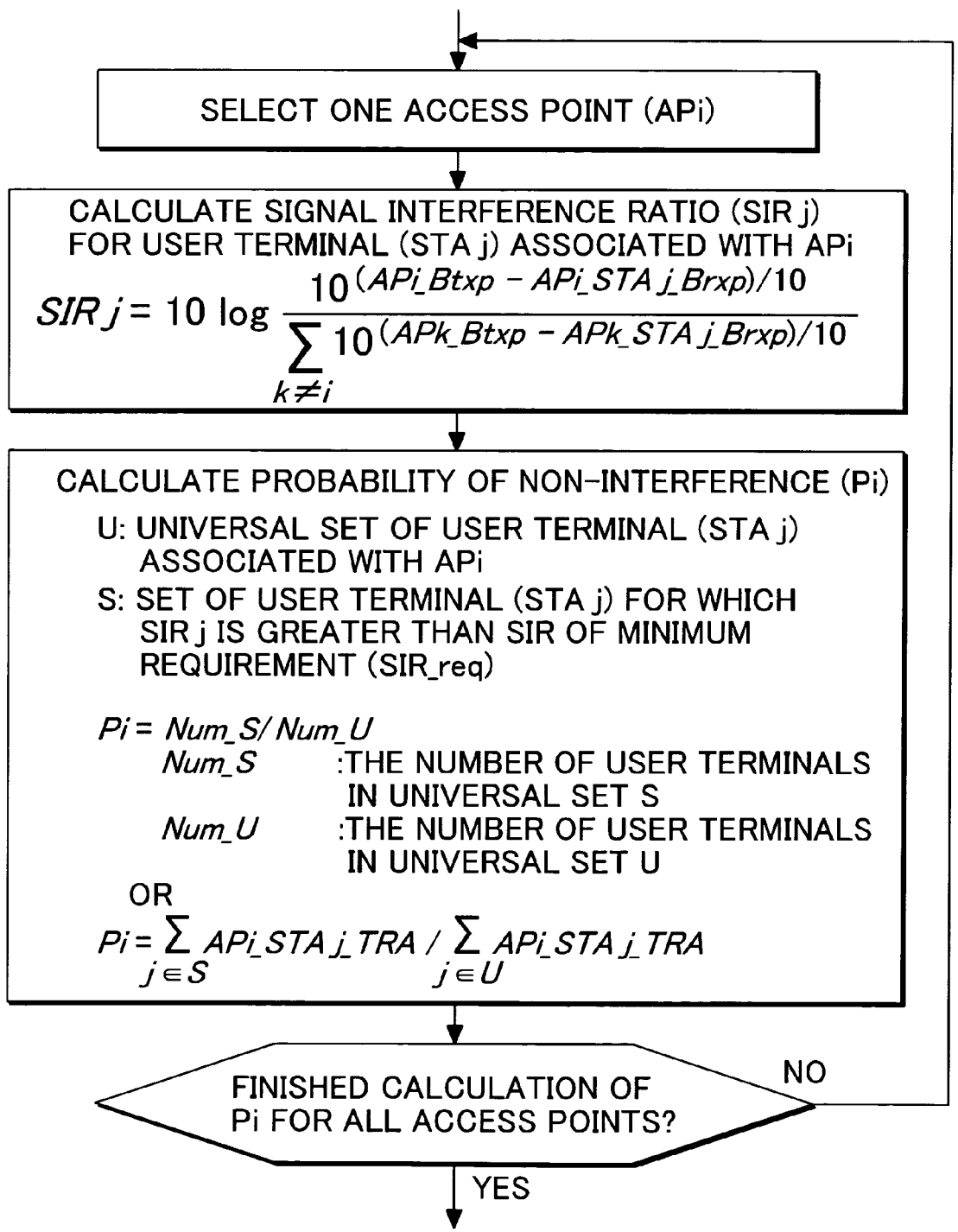
FIG. 9 is an algorithm (Part 2) of transmitting control information calculation in the preferred embodiment of the present invention.
Figure 10:
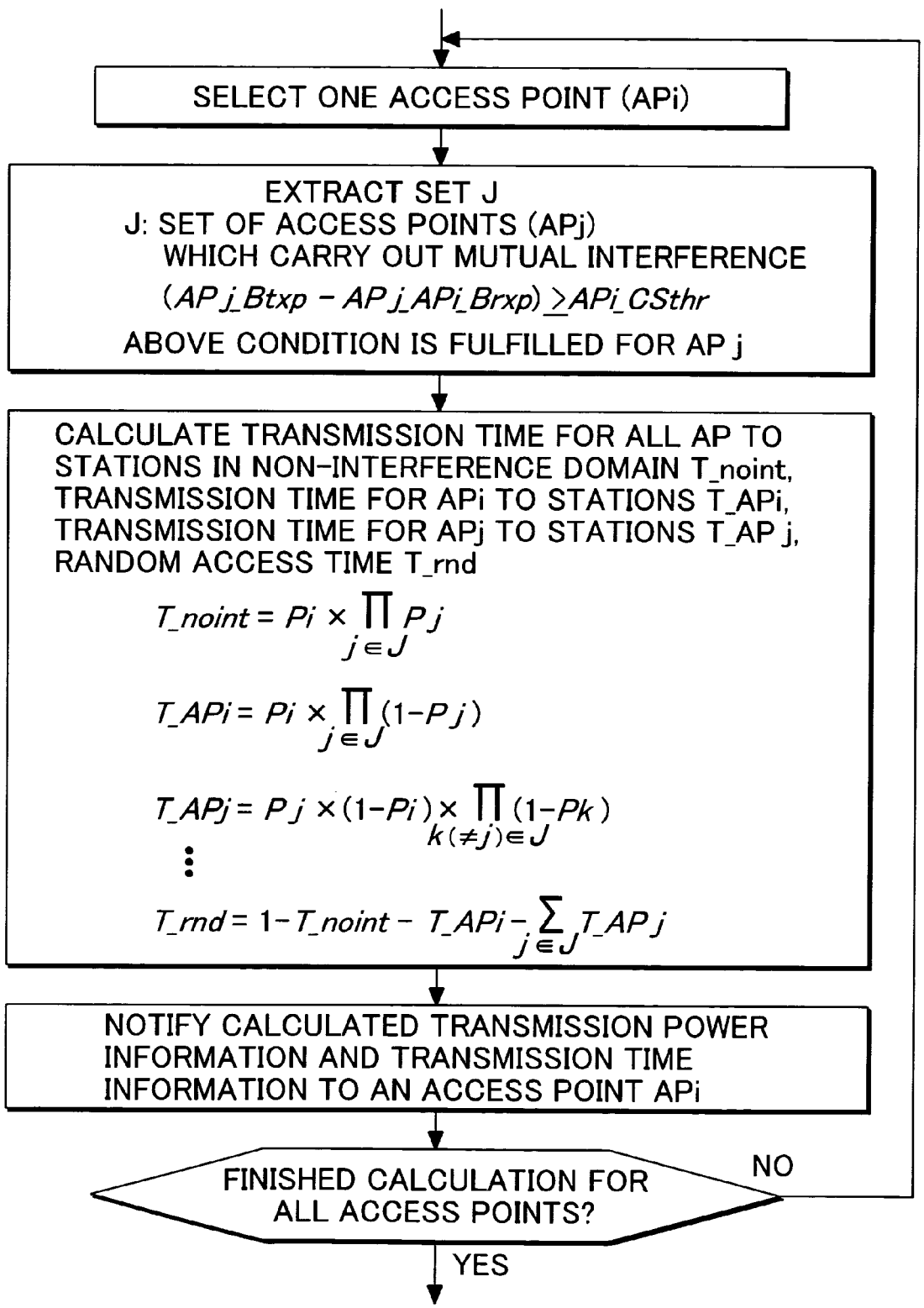
FIG. 10 is an algorithm (Part 3) of transmitting control information calculation in the preferred embodiment of the present invention.

FIG. 8, FIG. 9, and FIG. 10 illustrate algorithms of transmitting control information calculation in the preferred embodiment of the present invention.

The algorithm of transmitting control information calculation can be roughly classified into following three steps.

Step 1: The predetermined transmission power to the terminals STAj associated with each access point APi is calculated.

Step 2: It is judged whether the user terminal STAj associated with each access point APi is in the interference domain or in the non-interference domain and traffics in the non-interference domain and interference domain area compared with each other. For instance, a rate of the number of user terminals in the non-interference domain or a rate of traffic to the number of user terminals in the non-interference domain (hereinafter, referred to as probability Pi of non-interfering) is calculated.

Step 3: Using the probability Pi of non-interfering obtained in the step 2, the transmission timing information of the access point APi described in FIG. 4 (transmission time for all AP to user terminals in non-interference domain T_noint, transmission time for APi to user terminals in non-interference domain T_APi, transmission time for APj to user terminals in non-interference domain T_APj, random access time T_rnd) is calculated.

Details of each step will be described below with reference to the accompanying drawings.

The step 1 will be described with reference to FIG. 8. Only one access point APi is selected and the predetermined transmission power APi_STAj_Dtxp of the user data to the user terminal STAj associated with the access point APi is calculated with the formula 1.

$$APi\_STAj\_Dtxp = (APi\_Btxp - APi\_STAj\_Brxp) + Min\_Drxp + \alpha \quad \text{[Formula 1]}$$

Here, each symbol is assumed to have following meaning.

APi_Btxp: Transmission power of beacon signal of the access point APi (value read from the database for transmitting control)

APi_STAj_Brxp: Received power of beacon signal when the user terminal STAj has received the beacon signal of the access point APi (value read from the database for transmitting control)

Min_Drxp: Minimum received power required for correct decoding and demodulation of user data (fixed value)

$\alpha$: Margin for variation of received power (fixed value)

The predetermined transmission power is obtained using the formula 1 for all access points. Here, transmission is not performed with unnecessarily higher transmission power in view of reducing interference on the other communications as much as possible.

The step 2 will then be described with reference to FIG. 9. Only one access point APi is selected and the signal pair interference power ratio SIRj of the user terminal STAj associated with the access point APi is obtained from the formula 2.

$$SIRj = 10 \log \frac{10^{(APi\_Btxp - APi\_STAj\_Brxp)/10}}{\sum_{k \neq i} 10^{(APk\_Btxp - APk\_STAj\_Brxp)/10}} \quad \text{[Formula 2]}$$

Next, the universal set of user terminals associated with the access point APi is designated as U, while a set of user terminals in which the signal pair interference power ratio SIRj of the user terminal STAj is equal to the predetermined signal pair interference power ratio SIR_req or higher. In this case, the probability of non-interference Pi may be obtained from any one of the formulae 3 and 4.

$$Pi = Num\_S/Num\_U \quad \text{[Formula 3]}$$

$$Pi = \sum_{j \in S} APi\_STAj\_TRA \bigg/ \sum_{j \in U} APi\_STAj\_TRA \quad \text{[Formula 4]}$$

Here, each symbol is assumed to have the following meaning.

Num_S: Number of user terminals of the set S of user terminals in which the signal pair interference power ratio SIRJ of the user terminal STAj is equal to the predetermined signal pair interference power ratio SIR_req or higher (obtained from the database for transmitting control)

Num_U: Number of user terminals of the universal set U of user terminals associated with the access point APi (obtained from the database for transmitting control)

APi_STAj_TRA: Traffic information to the user terminal STAj from the access point APi (read from the database for transmitting control)

The probability of non interference Pi is also obtained for the other access points.

The step 3 will be described with reference to FIG. 10. In order to classify the transmission time into the time for simultaneous communications of a plurality of access points and the time for communications by random access, it is required that a plurality of access points are considered as one group and the timings for various communications of all access points within the same group must be placed under the adequate management. The group of such access points is designated as a set of access points which carry out mutual interference. Only one access point APi is selected and a set J of access points APj satisfying the formula 5 for the access point APi (set of access points which carry out mutual interference) is obtained.

$$(APj\_Btxp - APj\_APi\_Brxp) \geq APi\_CSthr \quad \text{[Formula 5]}$$

Here, each symbol is assumed to have following meaning.

APj_Btxp: Transmission power of beacon signal of the access point APj (read from the database for transmitting control)

APj_APi_Brxp: Received power of beacon signal which has been transmitted from the access point APj and received by the access point APi (read from the database for transmitting control)

APi_CSthr: Carrier sense threshold of the access point APi (read from the database for transmitting control)

Next, using the probability Pi of non-interference of the access point APi obtained previously and probability Pj of non-interfering of the access point Pj associated with a set of access points which carry out mutual interference, the transmission time for all AP to user terminals in non-interference domain T_noint, the transmission time for Api to user terminals in non-interference domain T_APi, the transmission time for Apj to user terminals in non-interference domain T_APj, and the random access time T_rnd are obtained as the transmission timing control information from the formulae 6, 7, 8, and 9.

$$T\_noint = Pi \times \prod_{j \in J} Pj \quad \text{[Formula 6]}$$

$$T\_APi = Pi \times \prod_{j \in J} (1 - Pj) \quad \text{[Formula 7]}$$

$$T\_APj = Pj \times (1 - Pi) \times \prod_{k(\neq j) \in J} (1 - Pk) \quad \text{[Formula 8]}$$

$$T\_rnd = 1 - T\_noint - T\_APi - \sum_{j \in J} T\_APj \quad \text{[Formula 9]}$$

In the other embodiment, the non-interference transmission time T_noint and the random access time T_rnd are obtained from the formulae 10 and 11 under the condition that the transmission time for APi to user terminals in non-interference domain T_APi and transmission time for Apj to user terminals in non-interference domain T_APj are set to 0.

$$T\_noint = \min_{j \in J}\{Pi, Pj\} \quad \text{[Formula 10]}$$

$$T\_rnd = (1 - T\_noint) \quad \text{[Formula 11]}$$

However, the transmission time for all AP to user terminals in non-interference domain or the like of the above formula has been normalized with the control frame time. The transmission timing obtained with the formulae 6, 7, 8, and 9 or 10, and 11 is notified as the transmitting control signal to the access point APi with addition of the transmission power information obtained from the formula 1.

The processes described above are performed to all access points.

FIG. 11 is an explanatory diagram of the transmitting control signal from a management server to an access point in the embodiment of the present invention. One control frame time T_frame means a time duration to generate down-link traffic to the terminal to which the access point APi belongs. Transmission is performed to the terminals in the non-interference domain in the transmission time for all AP to user terminals in non-interference domain T_noint. The number of interference access points AP_num is notified and the ID (address or the like) AP_ID of the access points APi as many as AP_num and each transmission time for APi to user terminals in non-interference domain T_APi are also notified. Within the set of the identical interference access points, the transmission sequence can be maintained among a plurality of access points by arranging the access point IDs in the ascending order. The transmission sequence is maintained among a plurality of access points. When elements of the set of interference access points of access point AP1 are different from that of the set of interference access points of access point AP2, the access points which will become the common elements are grouped first and the access points of different elements are grouped subsequently to keep the ascending order of the access point ID within the group.

The access point APi is capable of transmitting the user data to the terminals within the non-interference domain during the transmission time for APi T_API and also transmits this data to the terminals in the interference domain during the other period. In the random access time T_rnd, the user data can be transmitted to the user terminals within the interference domain.

The number of terminals under the management of access points is notified with the number of user terminals STA_Num. The SIR which suggests the judgment criterion for the user terminals within the interference domain or in the non-interference domain with the predetermined signal pair interference power ratio SIR_req. The terminal ID (STA_ID such as address), the signal pair interference power ratio SIRj obtained from the formula 2, and the predetermined transmission power APi_STAj_Dtxp obtained from the formula 1 are notified. Otherwise, it is also allowed that the result of judgment by the management server to detect each user terminal existing in the non-interference domain or in the interference domain is notified in the form of a graph, in place of notifying the predetermined signal pair interference power ratio SIR_req and the signal pair interference power ratio SIRj at each user terminal. The access point APi controls each user terminal as illustrated in FIG. 11 depending on the notified transmission timing and the transmission power.

FIG. 12 illustrates an example of structure of the transmission control part of access point in the embodiment of the present invention. The transmission control part has the function to set the transmission timing and transmission power to each user terminal in accordance with the transmitting control signal from the management server.

First, when the user data packet reaches the transmission control part, a transmission queue distributing part 1201 distributes the packets to the transmission queues 1202a, 1202b, 1202c by reading the destination address of packets. Distribution to the transmission queue may be realized with the following two kinds of methods.

Method for assigning one by one the user terminals to the transmission queue 1:

Method for collecting the user terminals, satisfying the predetermined signal pair interference power ratio SIR_req with the signal pair interference power ratio SIRj, to the transmission queue 1 and collecting the terminals, not satisfying the predetermined signal pair interference power ratio SIR_req, to the other transmission queue:

When the number of packets is counted in these transmission queues, the result may be used for obtaining the traffic information to the user terminals from the access points and the rate of communications between the non-interference domain and the interference domain.

Next, a transmission time control part 1203 extracts packets from the transmission queue depending on the designated transmission timing information. A synchronous timer 507 is set for synchronous interruption based on the information of one control frame time T_frame, transmission time for all AP to user terminals in non-interference domain T_noint, transmission time for Api to user terminals in non-interference domain T_API, transmission time for APj to user terminals in non-interference domain T_APj, and random access time T_rnd and the packets can be extracted from the transmission queue assigned to the user terminals for non-interference domain in the case of the transmission time for all AP to user terminals in non-interference domain T_noint and transmission time for Api to user terminals in non-interference domain T_APi when the interruption occurs.

A transmission power setting part 1204 sets the predetermined transmission power APi_STAj_Dtxp for the user terminal STAj to a radio transmitter 511.

A retransmission control part 1205 stores the packet transmitted to the radio transmitter 511 within a transmission buffer 1206 and waits for reception, from the radio receiver 512, of a message suggesting that the data arrival response packet Ack from the user terminal. When Ack time-out occurs earlier after the Ack waiting time is set to the synchronous timer 507, the retransmission control packet is also transmitted depending on the transmission timing by returning the packet stored in the transmission buffer 1206 to the transmission queue distributing part 1201.

Here, it is also possible to form the structure in which a plurality of access points under the management of the management server are connected to the network via the management server. In this case, the traffic information and rate of communications between the non-interference domain and the interference domain can be detected in direct in the management server and thereby traffic of the control information between the management server and each access point can be reduced. Even in this case, detection of transmission link condition among the access points and between the access point and user terminal and control of timing for data transmission and transmission power can be performed in the same manner.

According to the present invention, the total throughput of the system can be improved, in the wireless access system, through time division of the transmission timing of access points not to eliminate collision of data packet for the user terminals which receive simultaneously the data packets transmitted simultaneously from a plurality of access points and cannot correctly demodulate the predetermined signal due to the collision of data packets and through the simultaneous transmission of transmission timing of access points for the user terminals which can correctly demodulate the predetermined signal when the signal pair interference power ratio is large even if collision of the data packets occurs.

FIG. 13 illustrates a graph indicating the result of evaluation of throughput in the preferred embodiments of the present invention.

During the transmission time for all AP to user terminals in non-interference domain, the access point 101a is transmitting the data to the user terminal 102a, while the access point 101b, to the user terminal 102b. Since both user terminals 102a and 102b exists within the non-interference domain, it can be understood that the throughput is 6 Mbps or higher.

During the transmission time for AP1 to user terminals in non-interference domain, the access point 101a is transmitting the data to the user terminal 102a, while the access point 101b, to the user terminal 102d. Although the terminal 102a transmits the data of 6 Mbps or higher, the data communication rate is deteriorated to about 3 Mbps due to the collision of data packets from the access point 101a because the terminal 102d exists within the non-interference domain.

During the transmission time for AP2 to user terminals in non-interference domain, the access point 101a is transmitting the data to the user terminal 102c, while the access point 101b, to the user terminal 102b. In this time, the terminal 102c is transmitting the signal in the rate of about 3 Mbps, while the terminal 102b, in the rate of about 6 Mbps or higher with the similar reason.

During the random access time, the access point 101a is transmitting the data to the user terminal 102c, while the access point 101b, to the user terminal 102d. Since both terminals are in the non-interference domain, the transmission rate of both terminals 102c and 102d is about 3 Mbps.

FIGS. 14A and 14B illustrate the graphs regarding the effect of the embodiments of the present invention. Probability P1 of non-interference of the access point 101a and probability P2 of non-interference of the access point 101b are designated as the same value P in order to evaluate the throughput of the total system. Since the access point 101a and the access point 101b have been operated with the fixed transmission power in the prior art, the transmission timing has been divided with time using the carrier sense. Therefore, the throughput of system has been about 6 Mbps. In the present invention, however, the throughput can be raised up to about 12 Mbps which is equal to two times the throughput when the value of probability of non-interference is one (1). When the number of access points increases, the effect proportional to the number of access points can be obtained when the value of probability of non-interference is one (1).

What is claimed is:

1. A radio-communication control method in the communication system wherein the user terminals which are requesting radio-communication are connected to the wired network via the access points, in which:

the received powers of the signals transmitted from a plurality of access points are measured with user terminals and the desired signal pair interference power ratio is obtained from a ratio of the received power of signal at the access point to which a user terminal belongs to the received power of signal at the other access point;

when said signal pair interference power ratio is larger than the predetermined signal pair interference power ratio, the user terminal is judged to exist within the non-interference domain;

when said signal pair interference power ratio is smaller than the predetermined signal pair interference power ratio, the user terminal is judged to exist within the interference domain;

the transmission time from the access point to a user terminal in the non-interference domain and to a user terminal in the interference domain is divided with time to respectively obtain a first time period and a second time period;

simultaneous communications are performed, in said first time period, to a plurality of user terminals in the non-interference domain from a plurality of corresponding access points; and communications are performed on the time division basis, in said second time period, to the user terminals in the interference domain from a plurality of access points.

2. The communication system according to claim 1, wherein sharing of time of said first time period and second time period is determined based on a ratio of said user terminals in the non-interference domain to said user terminals in the interference domain for each access point or on a data communication amount to respective domains.

3. The communication system according to claim 1, wherein each access point invalidates, in said first time period, the carrier sense for detecting the other communication apparatus which is making communication using the common frequency band.

4. The communication system according to claim 1, wherein the beam signal transmitted in the predetermined transmission power from each access point discriminates said non-interference domain and said interference domain based on the power received at each user terminal.

5. The communication system according to claim 4, wherein the transmission power of the data signal to each user terminal is controlled, in said first time period, depending on the received power of said beacon signal.

6. A management server which is connected, within a radio-communication system comprising a plurality of access points and a plurality of user terminals connected to a wired network through said access points, to a plurality of said access points for management of data transmission to a plurality of corresponding user terminals from each access point, comprising:

a communication interface signal processing part for receiving, via a plurality of said access points, notification of the desired signal pair interference power ratio which is a ratio of the received power of the desired signal and interference signal at respective terminals of a plurality of said user terminals;

a database for storing the information received with said communication interface signal processing part; and a transmitting control information calculation part for generating the transmitting control information to be transmitted to a plurality of said access points via said wired interface signal processing part, based on the information stored in said database, wherein said transmitting control information calculation part discriminates, based on said desired signal pair interference power ratio, a plurality of said user terminals as the user terminals in the non-interference domain and the user terminals in the interference domain, divides with time the transmission times from the access points to the user terminals in the non-interference domain and to the user terminals in the interference domain to respectively generate a first time period and a second time period, and transmits, to a plurality of said access points, the control signal to instruct the simultaneous communications, in said first time period, to a plurality of user terminals in the non-interference domain from a plurality of corresponding access points and the communications, through the time-division in a plurality of said access points, in said second time period, to the user terminals in the interference domain.

7. The management server according to claim 6, wherein said transmitting control information calculation part determines time sharing of said first time period and second time period based on a ratio of the user terminals in said non-interference domain to the user terminals in said interference domain for each access point.

8. The management server according to claim 6, wherein said transmitting control information calculation part determines time sharing of said first time period and second time period based on a data communication amount to said non-interference domain and said interference domain for each access point.

9. The management server according to claim 6, wherein a synchronous signal generator for generating a synchronous signal is provided and said synchronous signal is transmitted to a plurality of access points via said wired interface signal processing part.

10. The management server according to claim 6, wherein the information of the data transmitting condition to a plurality of said user terminals from each access point is stored in said database.

11. The management server according to claim 10, wherein said data transmitting condition is expressed with the number of packets for each terminal, otherwise for each domain of the non-interference domain or interference domain in the transmitting queue to store the data packets transmitted to a plurality of said user terminals from each access point.

12. The management server according to claim 11, wherein said transmitting queue is provided therein through transmission of data signal transmitted to a plurality of said user terminals via a plurality of access points from said wired network.

13. An access point for making radio-communications with a plurality of user terminals in a radio-communication system comprising a plurality of access point devices, a plurality of user terminals connected to the wired network via said access point devices, and a management server for management of data transmissions to a plurality of corresponding user terminals from a plurality of said access point devices, comprising:

a synchronous timer for synchronization based on a synchronous signal received from said management server; and a transmission control part for controlling signal transmission to a plurality of said user terminals based on the transmitting control information transmitted from said synchronous timer and said management server, wherein a plurality of said user terminals are discriminated, based on the predetermined signal pair interference power ratio as the received power ratio of the desired signal and interference signal in respective user terminals, to the user terminals in the non-interference domain and the user terminals in the interference domain; and said transmitting control information divides with time the transmission times from the access points to the user terminals in the non-interference domain and the user terminals in the interference domain to respectively generate a first time period and a second time period and instructs a plurality of said access points to make simultaneous transmissions with the corresponding other access points to a plurality of user terminals in the non-interference domain in said first time period and to make communications through time-division with the other access points to the user terminals in the interference domain in said second time period.

14. The access point according to claim 13, wherein said transmitting control information includes the transmission power information of signal transmission to each user terminal and said transmission control part makes signal transmission to said user terminals with the transmission power in accordance with said transmission power information.

15. The access point according to claim 13, wherein a beacon generator is provided, a beacon signal generated with said beacon generator is transmitted by radio transmission, each user terminal receives the information of the received power of the beacon signals of the relevant access point device and the other access point devices and then transfers this information to said management server, and said transmitting control information has been calculated based on the information of said received power.

16. The access point according to claim 13, wherein each access point invalidates, in said first time period, the carrier sense for detecting the other communication apparatus which is making communication with the common frequency band.

17. The communication control method according to claim 1, wherein the unit of communication to user terminals from access points is defined as one frame period, a ratio (probability of non-interference) of the number of user terminals in the non-interference domain to the number of user terminals belonging to one access point is obtained, a plurality of access points make the simultaneous communications to the user terminals in the non-interference domain for the time determined by multiplying said one frame time with a product of the probabilities of non-interfering of each one among a plurality of access points, a plurality of access points make the communications on the time-division basis to the user terminals in the interference domain for the time determined by multiplying said one frame time with a product of the values (probability of interference) obtained in each one of a plurality of access points by subtracting the probability of non-interfering from one (1), only one access point makes the communication with user terminals in the non-interference domain for the remaining period of one frame period, and the other access points divide the period for communications with the user terminals in the interference domain.

18. The communication control method according to claim 17, wherein the time determined by multiplying said one frame time with the minimum value of the probability of non-interfering of each access point is assigned, in a plurality of access points, for the simultaneous communications to the user terminals in the non-interference domain, and the other time is assigned for the communications based on the time-division in a plurality of access points to the user terminals in the interference domain.

19. The communication control method according to claim 17, wherein the probability of non-interfering is defined as the total sum of traffics of the user terminals in non-interference domain for the total sum of traffics of the user terminals belonging to one access point.

20. The communication control method according to claim 19, wherein the number of bits per unit time in which the data to user terminals from access points enters the transmission queue of the access point.

* * * * *